US010675749B2

(12) United States Patent
Reinhart

(10) Patent No.: US 10,675,749 B2
(45) Date of Patent: Jun. 9, 2020

(54) KEYED RAIL AND SUPPORT SURFACE FOR SAW HORSE

(71) Applicant: Creative Plastic Concepts, LLC, Sycamore, OH (US)

(72) Inventor: Nickolas Reinhart, Findlay, OH (US)

(73) Assignee: Creative Plastic Concepts, LLC, Sycamore, OH (US)

( * ) Notice: Subject to any disclaimer, the term of this patent is extended or adjusted under 35 U.S.C. 154(b) by 498 days.

(21) Appl. No.: 15/382,866

(22) Filed: Dec. 19, 2016

(65) Prior Publication Data

US 2017/0173778 A1 Jun. 22, 2017

Related U.S. Application Data

(60) Provisional application No. 62/269,332, filed on Dec. 18, 2015.

(51) Int. Cl.

| | |
|---|---|
| ***B23Q 3/00*** | (2006.01) |
| ***B25H 1/06*** | (2006.01) |
| ***B25H 1/02*** | (2006.01) |
| ***B25H 1/08*** | (2006.01) |
| ***B25H 1/14*** | (2006.01) |
| *A47B 13/08* | (2006.01) |
| *A47B 13/00* | (2006.01) |

(52) U.S. Cl.

CPC ................ *B25H 1/06* (2013.01); *B25H 1/02* (2013.01); *B25H 1/08* (2013.01); *B25H 1/14* (2013.01); *A47B 13/003* (2013.01); *A47B 13/088* (2013.01)

(58) Field of Classification Search

USPC .............. 269/309, 311, 312; 182/153, 178.3, 182/178.5, 181.1

See application file for complete search history.

(56) References Cited

U.S. PATENT DOCUMENTS

| | | | | |
|---|---|---|---|---|
| 4,014,405 | A | 3/1977 | Breisch | |
| 5,348,276 | A * | 9/1994 | Blacker | B25B 1/08 269/152 |
| D392,746 | S | 3/1998 | Dickinson et al. | |
| 5,904,225 | A | 5/1999 | Patros | |
| D425,210 | S | 5/2000 | DuRapau | |

(Continued)

FOREIGN PATENT DOCUMENTS

| | | | |
|---|---|---|---|
| CA | 2315612 | A1 | 2/2001 |
| CA | 156738 | S | 1/2015 |

*Primary Examiner* — Joseph J Hail
*Assistant Examiner* — Shantese L McDonald
(74) *Attorney, Agent, or Firm* — Jacob M. Ward; Ward Law Office LLC

(57) ABSTRACT

A support system includes a base have a plurality of legs depending from a support portion. The support portion includes at least one slot formed therein, wherein a portion of a support member is received in the slot. A deck of the support system is configured to slidably engage a top portion of the support member. The support member may include a male key portion formed on a first end and female key portion formed on second end, the female key portion of one support member configured to receive the male key portion of another support member. A groove formed in each of the deck and the clamp is configured to receive the track portion therein, wherein the clamp can be slid along the support member via the track. The deck may comprise a plurality of panels coupled to each other using a coupling member.

9 Claims, 7 Drawing Sheets

(56) References Cited

U.S. PATENT DOCUMENTS

| | | | | |
|---|---|---|---|---|
| 6,123,173 | A | 9/2000 | Patros | |
| 6,164,413 | A | 12/2000 | Sagol | |
| 6,286,824 | B1 | 9/2001 | Sagol | |
| 6,305,498 | B1 | 10/2001 | Itzkovitch | |
| 6,401,865 | B1 * | 6/2002 | Elwick | B23Q 1/032 182/153 |
| 6,488,119 | B1 | 12/2002 | DuRapau et al. | |
| 7,481,254 | B2 * | 1/2009 | Welsh | B25H 1/04 144/286.1 |
| 7,861,752 | B1 * | 1/2011 | Leaf | B25H 1/06 144/278.1 |
| 8,042,794 | B2 * | 10/2011 | Marshall | B25H 1/04 269/136 |
| D722,183 | S | 2/2015 | Reinhart | |
| 2002/0125072 | A1 | 9/2002 | Levy | |
| 2003/0000770 | A1 | 1/2003 | Virtue | |
| 2005/0230188 | A1 | 10/2005 | Berg | |
| 2014/0145389 | A1 * | 5/2014 | Rowlay | B25B 5/006 269/97 |

* cited by examiner

KEYED RAIL AND SUPPORT SURFACE FOR SAW HORSE

CROSS-REFERENCE TO RELATED APPLICATIONS

This application claims priority to U.S. Provisional Application No. 62/269,332, filed on Dec. 18, 2015, the entire disclosure of which is incorporated herein by reference.

FIELD

The present disclosure relates to support systems and, more particularly, to support systems such as sawhorses, work benches, trestles, tables, and related structures.

BACKGROUND

Support systems such as sawhorses have long been used in the construction trade, typically providing a beam with four legs used to support construction materials for sawing. A pair of sawhorses can support a plank, for example, providing an easily made scaffold. Two sawhorses can also be used to easily form a work surface, through placement of a rigid sheet of plywood or a door on top thereof.

Typical sawhorses can be constructed in the field by attaching a cross beam between two sets of legs. However, the structural integrity of such sawhorses is directly related to the skill with which the various members are attached. Increased confidence can be obtained through use of molded plastic sawhorses, having both pre-formed plastic legs and a cross beam. Some plastic sawhorses also have pivoting legs, which advantageously permit the sawhorses to be collapsed when in storage or transit.

Even where the sawhorse has a sufficient structural integrity, the formation of a suitable working surface atop the sawhorse is often done in a makeshift manner. For example, as mentioned above, a user may simply lay a plank or a rigid sheet across a pair of sawhorses to form a working surface where a workpiece can be addressed. Although convenient, these makeshift working surfaces are generally lacking in safety and functionality. For example, where a working surface is formed by laying a rigid sheet across a pair of sawhorses, the working surface may be subject to shifting.

In addition to instability, it is generally not convenient to increase a size of the working surface. Instead, the size of the working surface is usually limited to the size of the panel laid upon the sawhorses. Increasing a size of the working surface may require a very large rigid sheet on many sawhorses, or alignment of many adjacent sheets side-by-side. However, this is either very cumbersome, in the case of handling a large sheet, or results in a non-uniform working surface, in the case of multiple adjacent sheets.

There is a continuing need for a support system such as a pre-formed plastic sawhorse with features that facilitates a more efficient connecting of multiple sawhorses to form work surfaces of different sizes and shapes. Desirably, the work surface features are easily storable together with the sawhorse when collapsed, and also permit the use of a variety of work implements.

SUMMARY

In concordance with the instant disclosure, a support system such as a pre-formed plastic sawhorse with features that facilitates a more efficient connecting of multiple sawhorses to form work surfaces of different sizes and shapes, and which work surface features are easily storable together with the sawhorse when collapsed, and also permit the use of a variety of work implements, is surprisingly discovered.

In concordance with the instant disclosure, a support system includes a base, a support member, and a deck. The base includes a plurality of legs depending from a support portion. The support portion includes at least one slot formed therein, wherein a portion of the support member is received in the slot. The deck of the support system is configured to slidably engage a top portion of the support member. The support member may include a male key portion formed on a first end and female key portion formed on second end. The deck may comprise a plurality of panels coupled to each other using a coupling member.

In another embodiment, a support system includes a base, a support member, and a clamp. The base includes a plurality of legs depending from a support portion. The support portion includes a slot formed therein, which receives a portion of the support member. The clamp is configured to slidably engage the support member. In a particular embodiment, the support member includes a track portion formed thereon. A groove formed in the clamp is configured to receive the track portion therein, wherein the clamp can be slid along the support member via the track. The clamp may include a resilient bumper disposed thereon, and configured to secure a workpiece in the support system.

In yet another embodiment, a support system includes a base, a support member, a deck, and a clamp. The base includes a plurality of legs depending from a support portion. The support portion includes a slot formed therein, which receives a portion of the support member. Each of the deck and the clamp is configured to slidably engage the support member. In a particular embodiment, the support member includes a track portion formed thereon. A groove formed in each of the deck and the clamp is configured to receive the track portion therein, wherein the clamp can be slid along the support member via the track portion.

DRAWINGS

The above, as well as other advantages of the present disclosure, will become readily apparent to those skilled in the art from the following detailed description, particularly when considered in the light of the drawings described hereafter.

DETAILED DESCRIPTION

Figure 1:
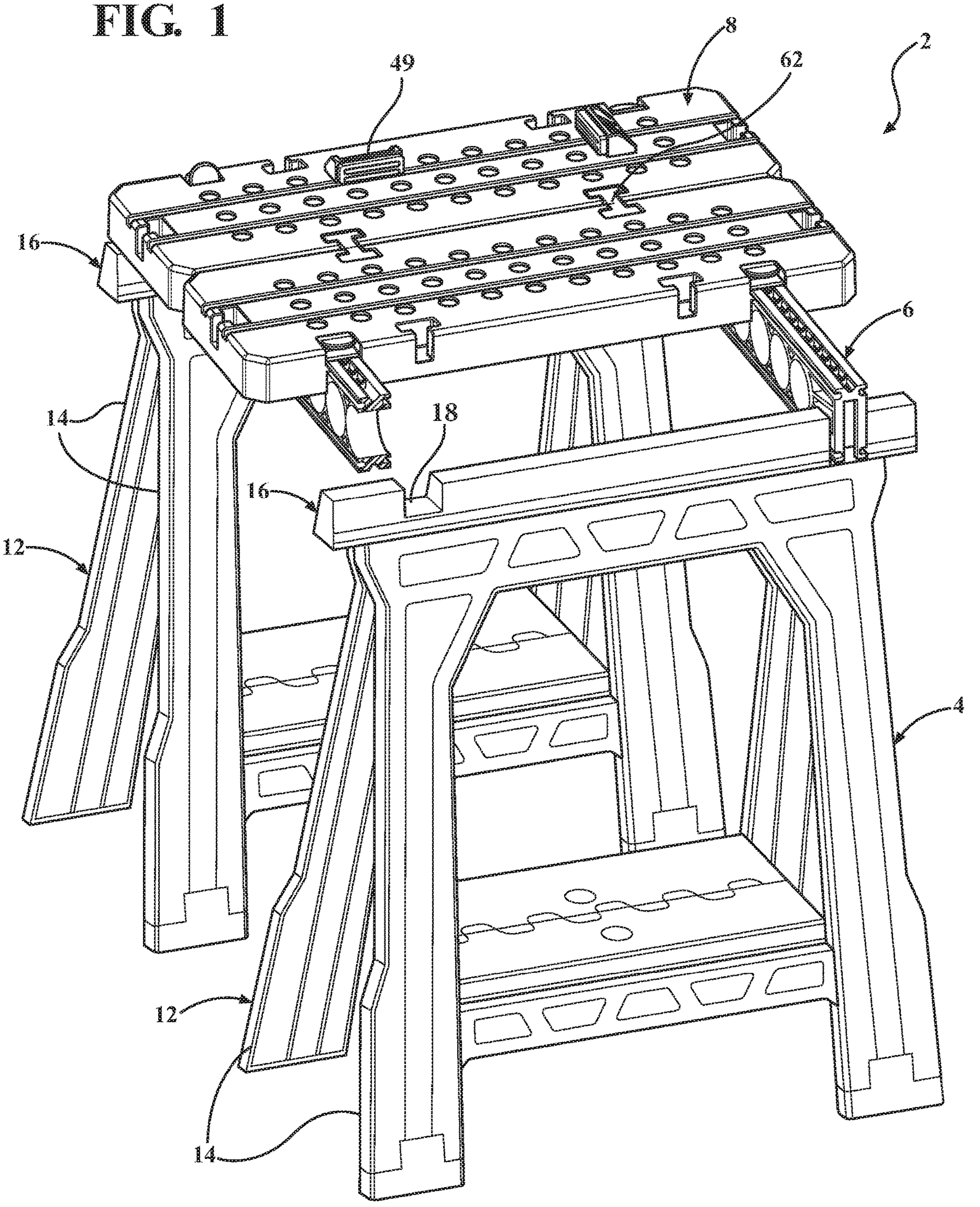
FIG. 1 is a top perspective view of a support system according to one embodiment of the present disclosure, including a pair of sawhorses connected in a row by a pair of support members and deck.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

In FIGS. 1-8, a support system 2 according to various embodiments of the present disclosure is shown. The support system 2 generally comprises a base 4 and a support member 6, and may further include one or both of a deck 8 and a clamp 10. Although the support system 2 is described herein as being molded from a thermoplastic material, a skilled artisan may select any suitable material for the support system 2, as desired.

Figure 2:
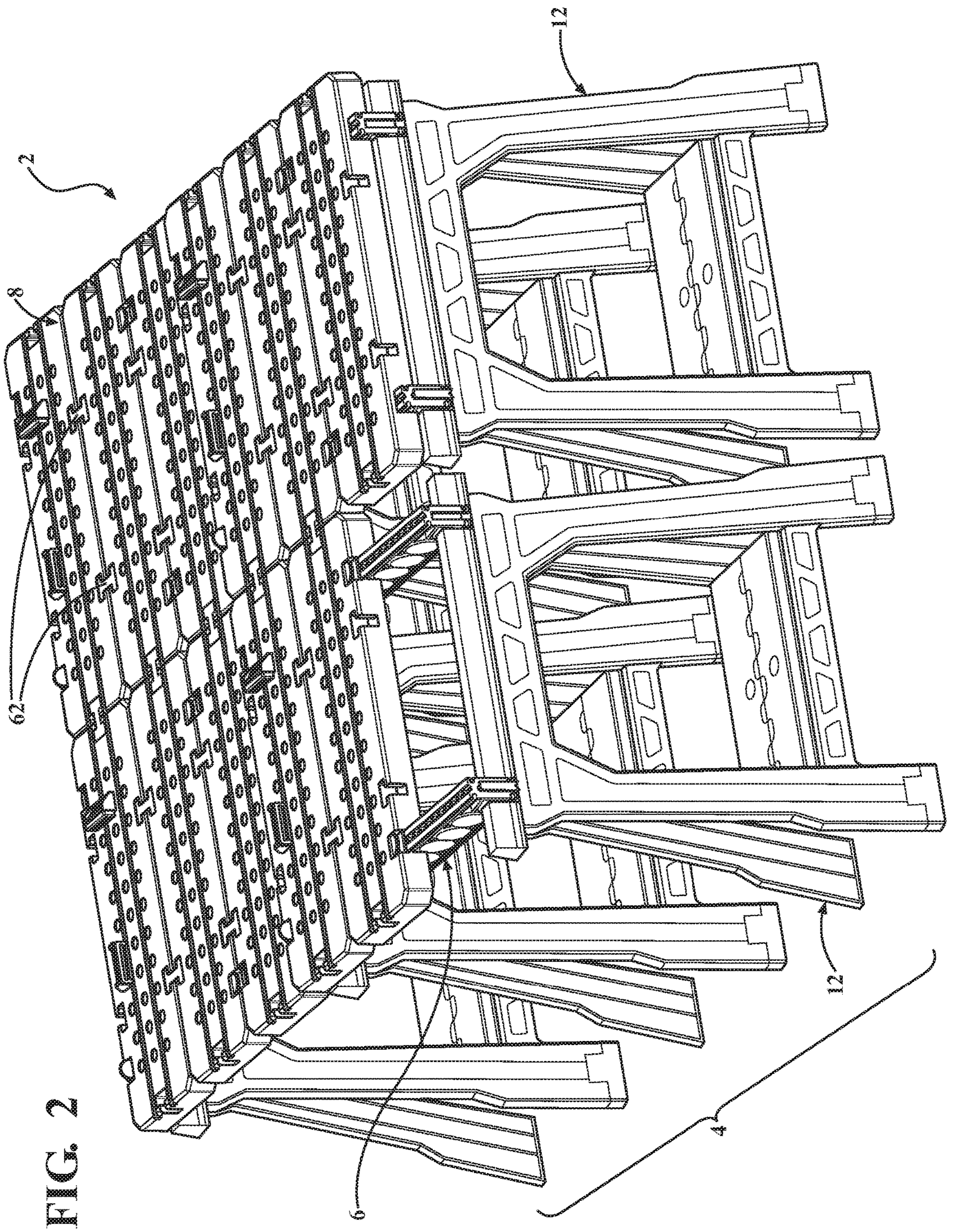
FIG. 2 is a perspective view of a support system according to another embodiment of the present disclosure, including multiple sawhorses connected in two rows.

As shown in FIGS. 1 and 2, the base 4 of the support system comprises a plurality of sawhorses 12. Each of the sawhorses 12 includes a plurality of legs 14, and a support portion 16 disposed atop the legs 14. As non-limiting examples, the base 4 may be a sawhorse 12 according to Applicant's co-pending U.S. patent application Ser. No. 15/006,180 or U.S. patent application Ser. No. 14/887,395, which are incorporated herein by reference. A skilled artisan may also select other suitable types of sawhorses 12 within the scope of the present disclosure.

Referring to FIG. 1, the support portion 16 of each sawhorse 12 contains a pair of spaced-apart slots 18. Each of the slots 18 opens upwardly with respect to a surface (not shown) on which the base 4 is supported. Each of the slots 18 is also configured to receive one of the support members 6 therein. In the illustrated embodiment, each slot 18 has a rectangular cross section, which corresponds with the shape and size of a standard two-by-four. For example, a distance between opposing sidewalls of the slot 18 may correspond to a width of the two-by-four, where the two-by-four is received in the slot 18 in an upright orientation. However, in alternate embodiments, the slot 18 may have a semi-cylindrical or polygonal cross section, as non-limiting examples.

In one embodiment, the slots 18 may be formed in the support system 2 adjacent opposite ends of the support portion 16. The slots 18 may be molded into the support portion 16, or can be defined by a metal insert (not shown) disposed on the support portion 16. Additional slots 18 may also be formed in the support portion 16, as desired.

Conversely, the support member 6 is configured to be received within the slot 18, where a cross section of the support member 6 corresponds to the cross section of the slot 18.

Figure 3:
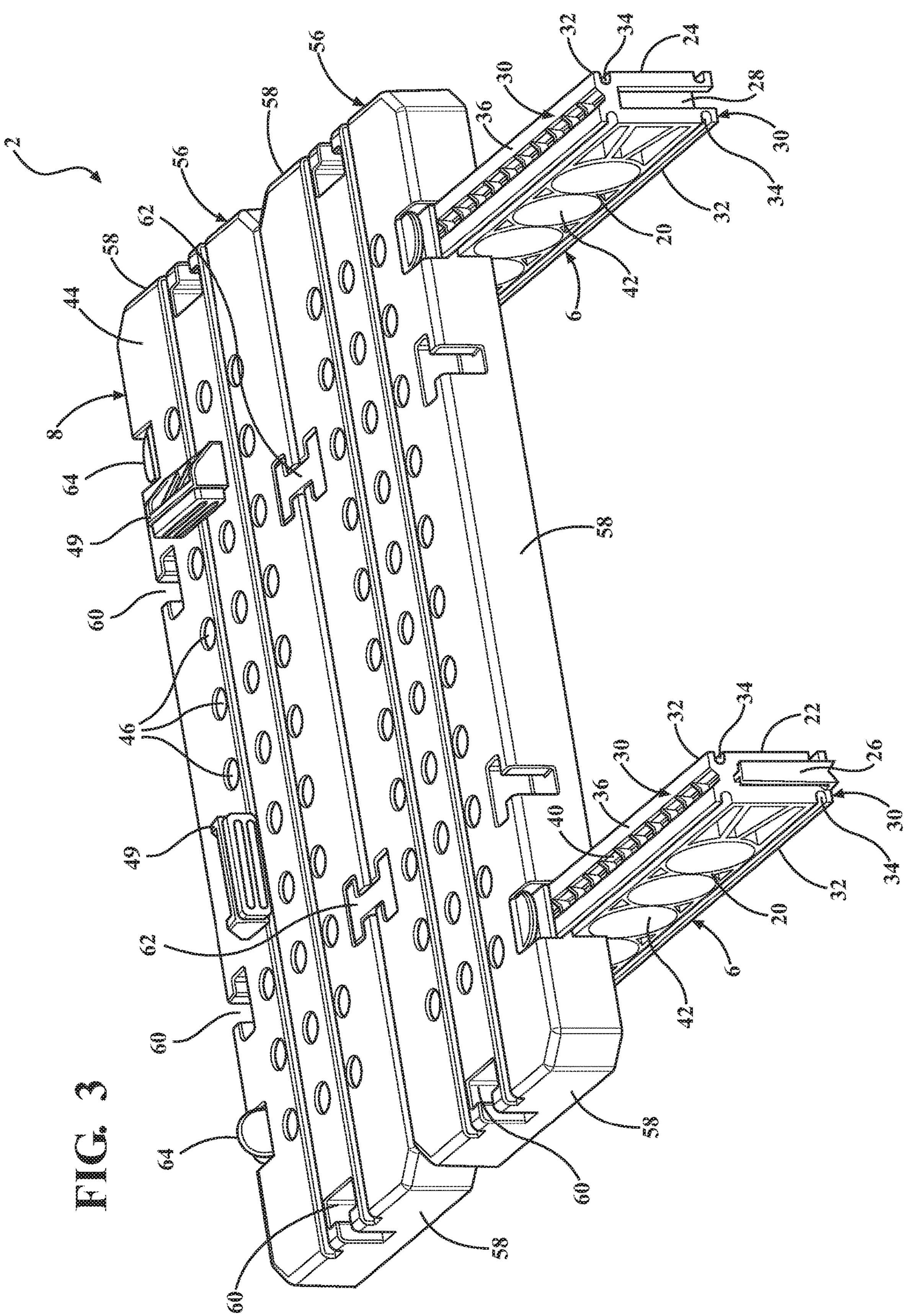
FIG. 3 is an enlarged top perspective view of the deck and the support members of the support system shown in FIG. 1.
Figure 4:
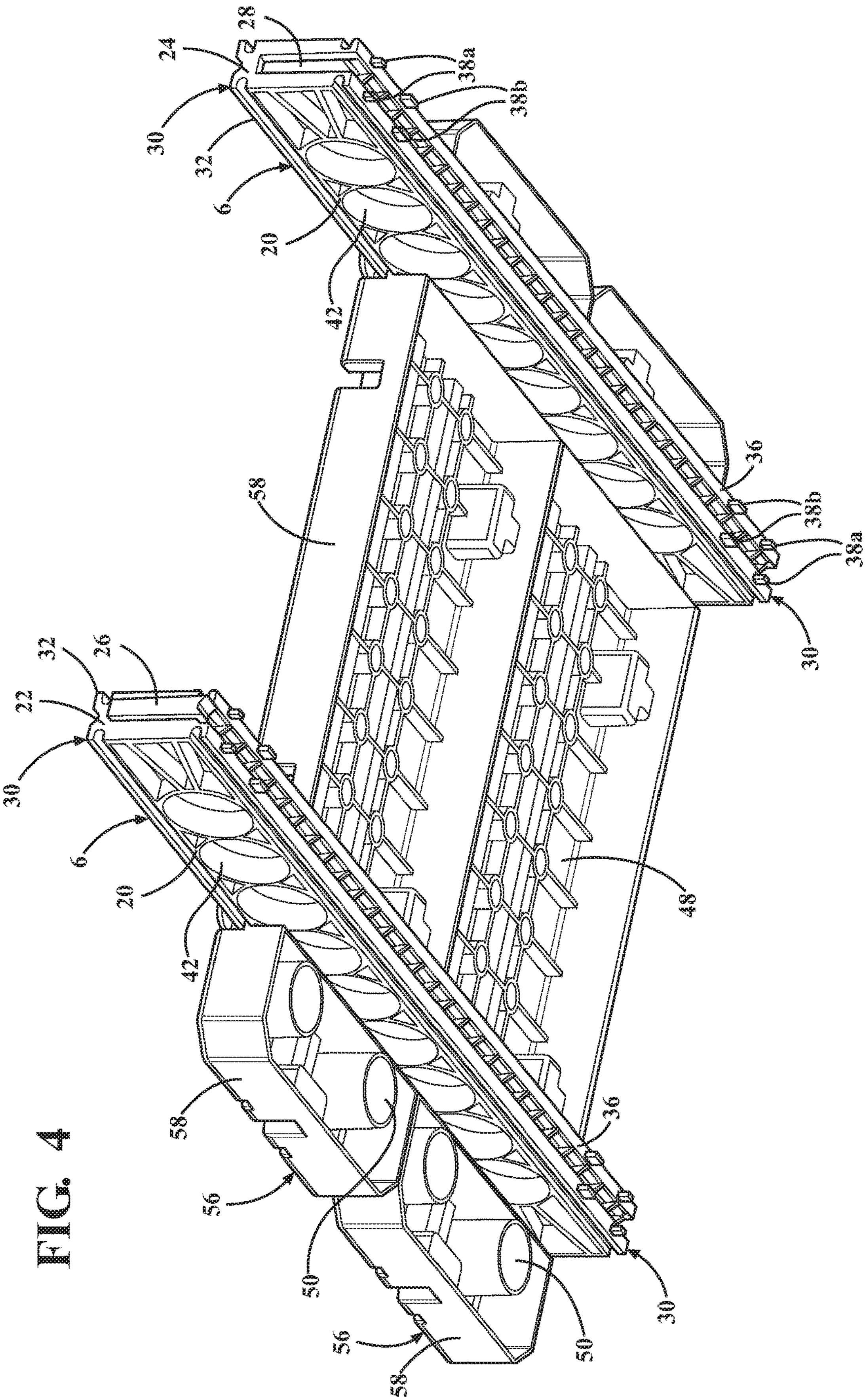
FIG. 4 is an enlarged bottom perspective view of the deck and the support members shown in FIG. 3.
Figure 8:
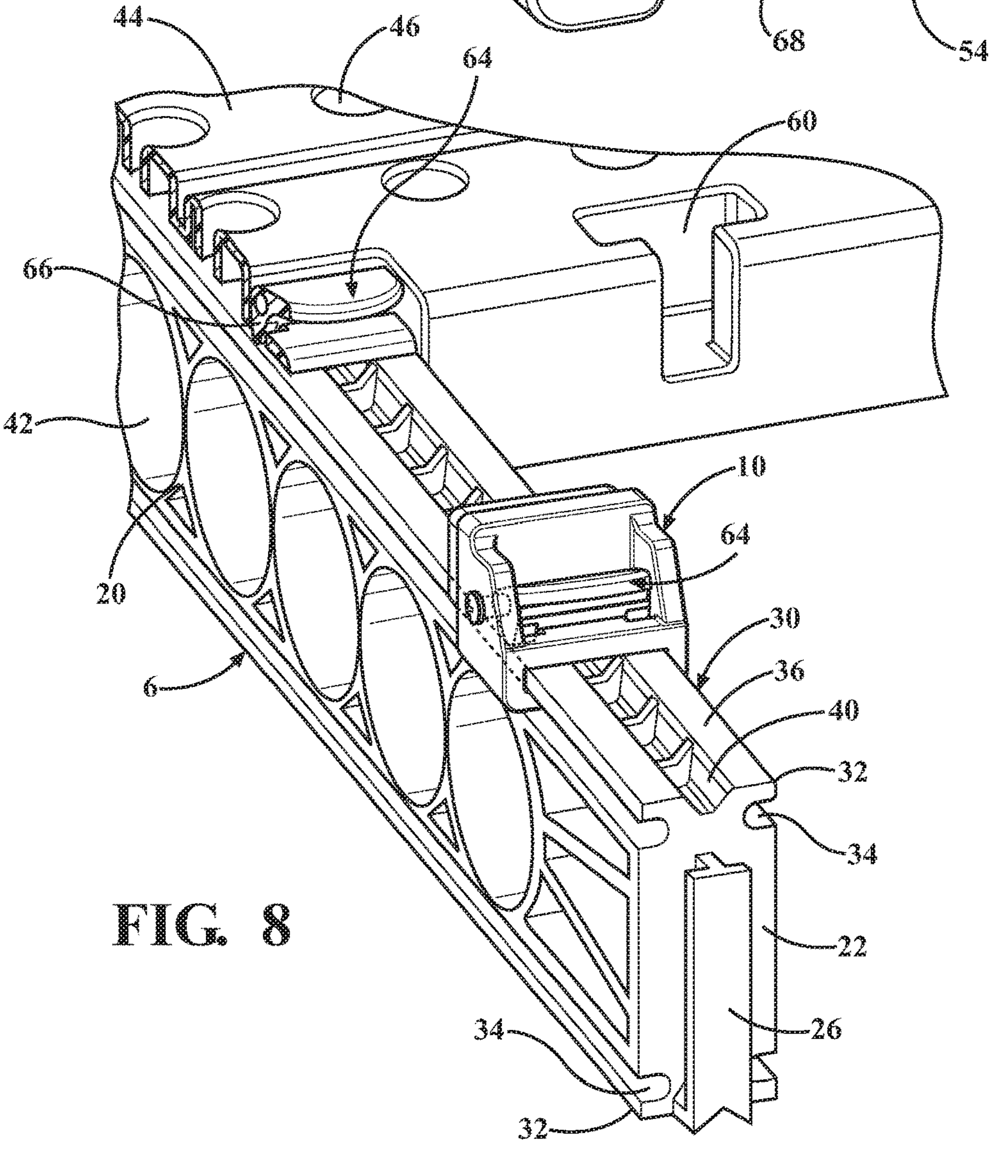
FIG. 8 is an enlarged fragmentary perspective view of the deck and one of the support members shown in FIG. 3, further including the clamp of FIG. 7 coupled to the support member.

With reference to FIGS. 3, 4, and 8, the support member 6 has an elongate body 20 with a first end 22 and a second end 24. The first end 22 has a male key portion 26 and the second end 24 has a female key portion 28. The male key portion 26 of one support member 6 is configured to slide into the female key portion 28 of another support member 6. The male key portion 26 may also be shaped appropriately so that when inserted in the female key portion 28, it cannot be removed laterally or longitudinally with respect to a length and width of the support member. For example, each of the male key portion 26 and the corresponding female key portion 28 may be substantially T-shaped in cross-section. In this manner, multiple ones of the support members 6 may be securely linked together in series. It should be appreciated that the employment of the male and female key portions 26, 28 thereby facilitates a lengthening of the support system 2 to any desired length.

The support member 6 may also have at least one track portion 30 configured to slidably engage the deck 8 to form a work support surface of the support system 2. The track portion 30 extends an entire length of the support member 6, where when a plurality of the support members 6 are linked together, the track portions 30 of the support members 6 are continuously formed. In a particular embodiment shown in FIGS. 3, 4, and 8, the support member 6 may have a pair of track portions 30, where one of the track portions 30 is formed on each of a top and a bottom of the support member 6 so that the support member 6 may be inserted in either direction into the slot 18 of the support system 2 and still present one of the track portions 30 for connection with the deck 8.

As shown in FIG. 8, a cross section of the track portion 30 is substantially T-shaped, and includes a pair of flanges 32 extending laterally outwardly in opposing directions from each other. In the illustrated embodiment, a continuous laterally outwardly opening channel 34 formed intermediate each flange 32 and the elongate body 20 of the support member 6. However, in alternate embodiments, the flanges 32 may extend laterally outwardly from the elongate body 20, forming an I-shaped support member 6. Each of the top and bottom track portions 30 defines respective top and bottom surfaces of the support member 6, and is configured to be engaged by the deck 8 or the clamp 10. In the illustrated embodiment, a contact surface 36 is a planar surface formed across the width of the support member 6.

The support member 6 may include a plurality of tabs 38 extending downwardly from the bottom of the support member 6. As shown in FIG. 4, the support member 6 includes corresponding pairs of the tabs 38, where one of the tabs 38 is arranged laterally across from another one of the tabs 38. A distance from one of the ends 22, 24 of the support member 6 to a first pair of the tabs **38*a* corresponds with half of a width of the support portion 16, wherein the first pair of the tabs 38*a* is configured to align the end of the support member 6 in a middle of the support portion 16. This arrangement is particularly useful when a plurality of the support members 6 are linked together, wherein a single slot 18 must receive the first end 22 of the support member 6 and second end 24 of a second support member 6. A distance between the first pair of the tabs 38*a* and a second pair of the tabs 38*b* corresponds to the width of the support portion 16, where a bottom of the slot 18 of the support portion 16 can be received between the first pair of the tabs 38*a* and the second pair of the tabs 38*b*. This arrangement is useful when a single support member 6 is received within the slot 18, such as on an end-most one of the sawhorses 12**, for example.

The elongate body 20 may further include a plurality of weight-reducing features 40, 42 formed therein. For example, the track portion 30 may further include a recess 40 formed in the contact surface 36, intermediate the flanges 32. The recess 40 includes a plurality of lateral ribs, configured to minimized deflection of the flanges 32. The support member 6 may further have a plurality of holes 42 formed therein. The holes 42 may be spaced apart along a length of the elongate body 20, for example. In addition to requiring less material for the support member 6 overall, the holes 42 permit the support member 6 to be lighter in weight and easier to both carry and store. Although shown being substantially cylindrical, it should appreciated that the holes 42 may be provided in any suitable shape by a skilled artisan, as desired.

With renewed reference to FIGS. 3-7, the deck 8 of the support system 2 has a top surface 44 and a bottom surface

48. The top surface 44 may be the primary surface defining the work support surface of the support system 2, upon which work implements and workpieces may be used or disposed. The top surface 44 is substantially planar, and may include a plurality of apertures 46 formed therein that permit the insertion of certain work implements 49, such as stops or rests for holding materials or tools, as desired.

Figure 5:
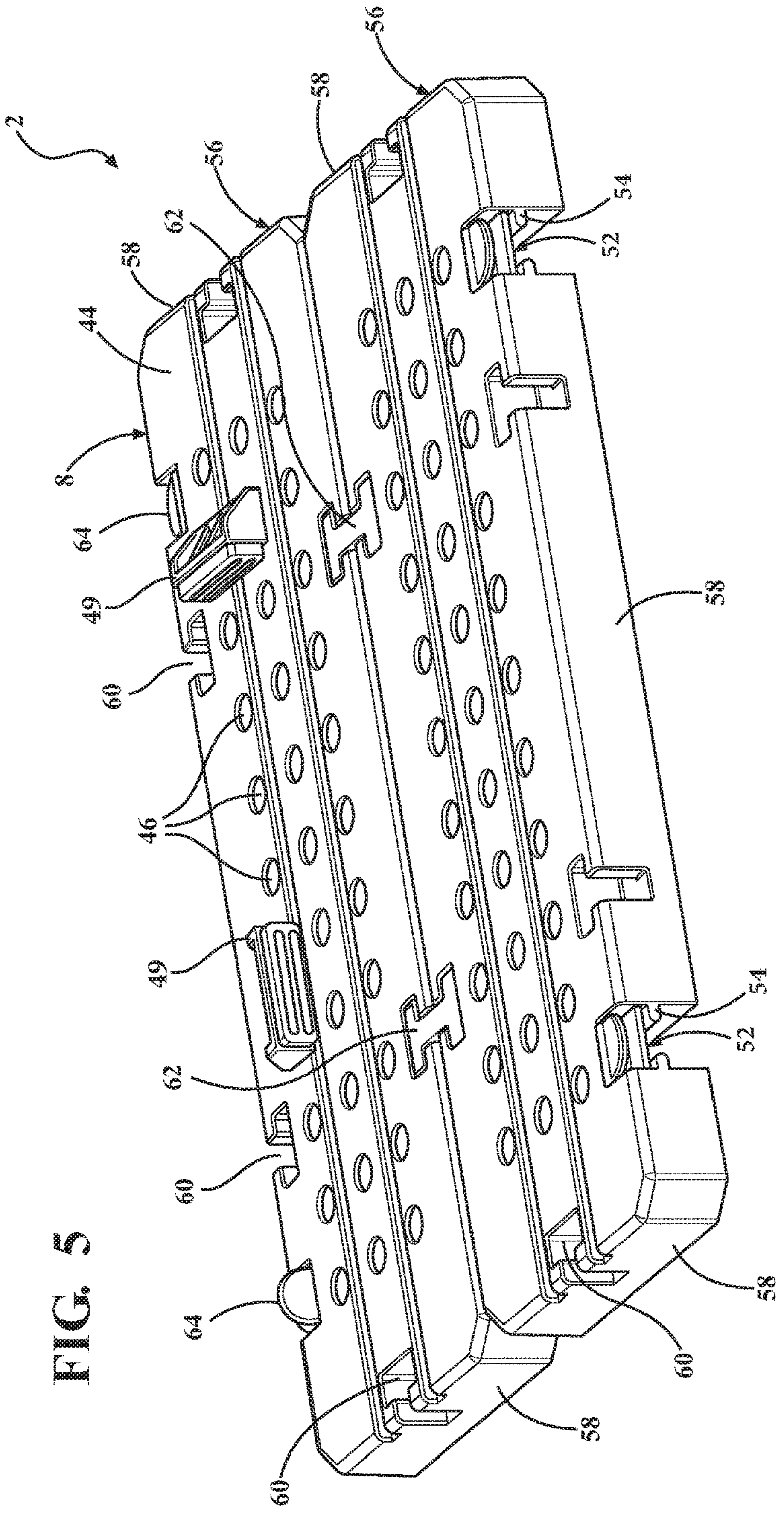
FIG. 5 is an enlarged top perspective view of the deck shown in FIG. 3, wherein the support members have been removed for clarity.
Figure 6:
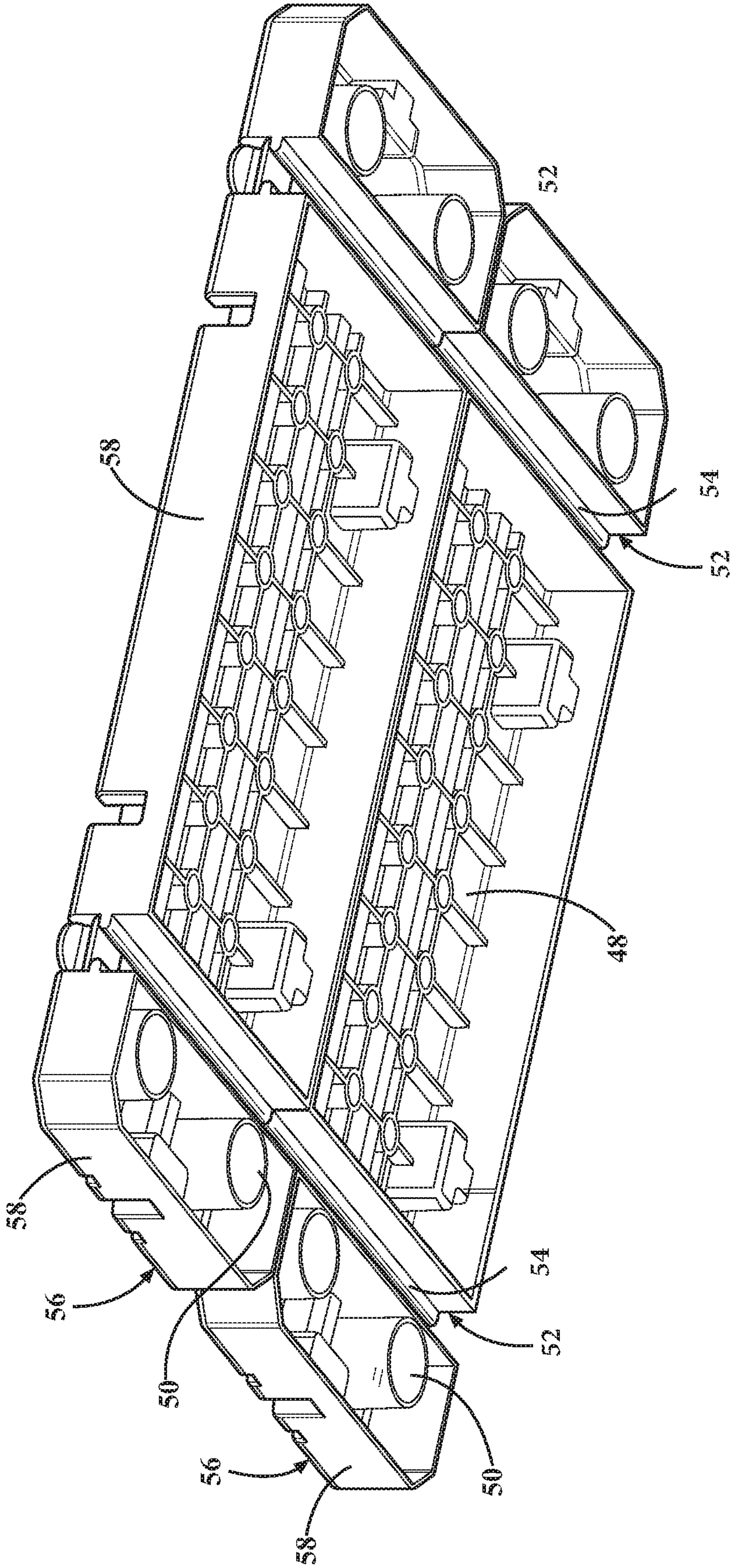
FIG. 6 is an enlarged bottom perspective view of the deck shown in FIG. 5.

As best shown in FIGS. 5 and 6, a groove 52 may be formed in the bottom surface 48 of the deck 8. In particular embodiments, the support member 6 is selectively slidably disposed within the groove 52 of the deck 8, and holds the deck 8 above the support portion 16 of the support system 2. Particularly, the groove 52 is configured to receive the track portion 30 therein, where the groove 52 and the track portion 30 cooperate to allow longitudinal motion of the deck 8 with respect to the support member 6, while minimizing vertical and lateral motion. In the illustrated embodiment, the groove 52 has a T-shaped cross section corresponding to the T-shaped cross section of the track portion 30. The groove 52 includes a pair of tongues 54 formed on opposing sides 58 thereof, wherein each one of the tongues 54 is configured to capture the flanges 32 of the support member 6 within the groove 52. In the illustrated embodiment, each one of the tongues 54 may be received in one of the channels 34 of the support member 6, as shown in FIGS. 3 and 4.

The bottom surface 48 of the deck 8 may further include a plurality of receptacles 50 configured to receive an alternate embodiment of the legs 14 therein. As shown in FIGS. 4 and 6, each of the receptacles 50 is a hollow body configured to receive a single leg 14 therein. Particularly, the receptacles 50 are cylindrical in shape, and are configured to receive cylindrical legs 14, such as a post. Accordingly, in alternate embodiments of the support system 2, the deck 8 may be used apart from the sawhorses 12 and the support members 6, wherein the deck 8 is supported only by the legs 14 received in the receptacles 50.

The deck 8 may comprise a plurality of separately formed panels 56, wherein the panels 56 are coupled together to form the deck 8. For example, a size of the deck 8 may be adjusted by adding or removing the panels 56, as desired. As shown, each one of the panels 56 has a generally rectangular perimeter, including four straight sides 58. Each one of the sides 58 includes at least one coupling feature 60 formed therein. The coupling feature 60 of each side 58 is configured to cooperate with a corresponding one of the coupling features 60 of an adjacent one of the panels 56 to couple two of the panels 56 side-to-side or end-to-end, as desired. As shown the coupling feature 60 is a T-shaped recess formed in the top surface 44 of the panel 56. The coupling feature 60 may be formed partially or entirely therethrough.

As shown in FIGS. 3 and 5, the deck 8 may further include at least one coupling member 62 configured to be received in the coupling features 60 of each of the panels 56 to couple the panels 56 together. In particular, a first portion of the coupling member 62 is configured to be received in the coupling feature 60 of a first one of the panels 56 and a second portion of the coupling member 62 is configured to be received in the coupling feature 60 of an adjacent second one of the panels 56. In the illustrated embodiment, the coupling member has an I-shaped cross section, wherein opposing T-shaped ends of the coupling member 62 form the first portion and the second portion, and are configure to be received in the T-shaped recesses of the coupling features 60, as described above.

Each one of the panels 56 may further include at least one locking device 64, as shown in FIG. 8. The locking device 64 permits the panels 56 and the deck 8 to be locked into place on the support member 6 to secure a desired position. The locking device 64 is disposed above the groove 52, where a portion of the locking device 64 can be selectively disposed within the groove 52 to engage the support member 6, thereby militating against relative motion of the panel 56 with respect to the support member 6. As shown, the locking device 64 is a rotatable cam having a lobe 66 formed thereon. When locking device 64 is rotated to a first position, the lobe 66 is retracted from the groove 52 and is spaced apart from the support member 6. When the locking device 64 is rotated to a second position, the lobe 66 extends into the groove 52, thereby compressing the support member 6 against the tongue 54 of the groove 52 to secure the position of the panel 56 on the support member 6.

Figure 7:
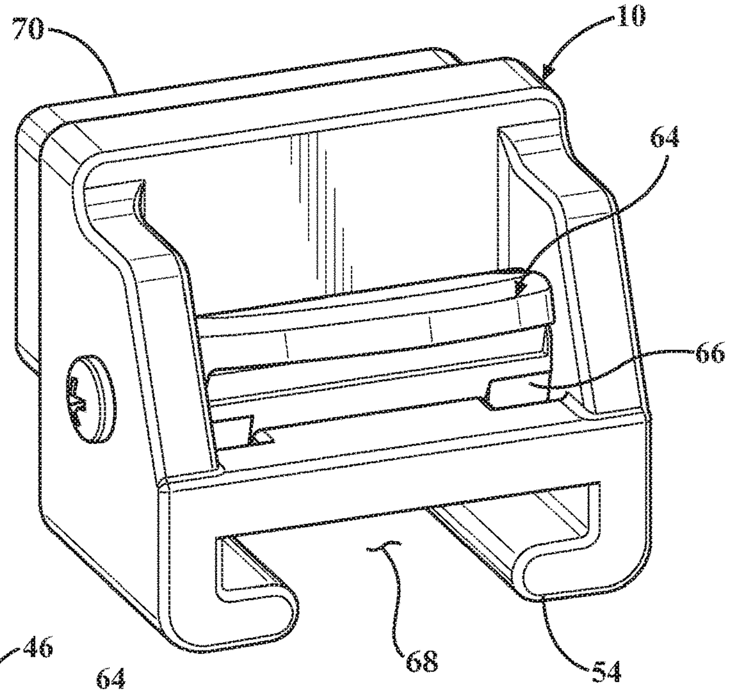
FIG. 7 is a top perspective view of a clamp for the support system according to the present disclosure.

As shown in FIG. 7, the clamp 10 includes a groove 68 formed therein. The groove 68 of the clamp 10 is configured similar to the groove 52 of the deck 8. Accordingly, the clamp 10 is also configured to be slidably disposed on the track portion 30 of the support member 6. The clamp 10 also includes one of the locking devices 64, as described above, which is configured to secure a position of the clamp 10 along the support member 6. The clamp 10 may further include a resilient bumper 70 configured to engage a workpiece (not shown). For example, the bumper 70 may be a rubber bumper 70 configured to be compressed against the workpiece to prevent movement of the workpiece on the deck 8. One of ordinary skill in the art may select other suitable configurations for the sliding clamp 10, as desired.

Although not shown herein, it should be appreciated that a variety of work implements such as clamps, tools, power tooling, tool holders, etc. may be secured to the support system 2 via at least one of the support member 6, the deck 8, and the clamp 10. Particular implements may have attachment features configured to cooperate with at least one of the support member 6, the deck 8, and the clamp 10, as desired. One of ordinary skill in the art may select suitable types of work implements and attachment features within the scope of the present disclosure.

In use, an overall size and shape of the support system 2 may be configured by a user as desired. For example, as shown in FIGS. 1 and 2, a size of the support system may be increased or decreased by adding or removing bases 4, support members 6, and panels 56, as desired. The support system of FIG. 1 comprises a base 4 having two of the sawhorses 12, where a single pair of the support members 6 spans the support portions 16 of the sawhorses 12. In this configuration, the support portions 16 of each saw horse are received in the space formed intermediate the first pair of tabs **38*a* and the second pair of tabs 38*b* to secure the support members 6 in each of the slots 18. The panels 56 of the deck 8 are slid onto the support members 6 and are coupled side-to-side to form a two-panel 56 deck 8. When the user wishes to increase the size of the support system, additional sawhorses 12, support members 6, and panels 56 may be added to the support system, as shown in FIG. 2. Multiple rows of sawhorses 12 may be utilized, wherein the panels 56 forming the deck are coupled end-to-end to increase a width of the support system 2. The support system may be configured with panels 56, clamps 10**, or a combination thereof.

Advantageously, the modular support system 2 described herein facilitates a more efficient connecting of multiple support systems 2 to form work surfaces of different sizes and shapes. The support system 2 as described hereinabove is easily storable, and also permits the use of a variety of work implements as described.

While certain representative embodiments and details have been shown for purposes of illustrating the invention, it will be apparent to those skilled in the art that various changes may be made without departing from the scope of the disclosure, which is further described in the following appended claims.

What is claimed is:

1. A support system, comprising;

a base having a plurality of legs depending from a support portion, the support portion having a slot disposed therein;

a support member disposed in the slot; and a deck configured to slidably engage the support member, wherein the deck includes at least one side surface, a top surface and a bottom surface, a groove formed in the bottom surface, the support member selectively slidably disposed within the groove and holding the deck above the support portion of the support system, wherein the deck has a coupling feature, the coupling feature being a T-shaped recess formed in the top surface of the deck and being open to the at least one side surface, wherein the support member includes a track formed along a length thereof, the track configured to engage the groove of the deck, and wherein each of the track and the groove of the deck have a T-shaped cross section, the track configured to be slidably received within the groove.

2. The support system of claim 1, wherein the support member has a first end with a male key portion and a second end with a female key portion, the male key portion of one support member configured to engage the female key portion of another support member.

3. The support system of claim 2, wherein the male key portion is a T-shaped rail and the female key portion is a T-shaped slot, the female key portion configured to slidably receive the male key portion therein.

4. The support system of claim 3, wherein the male key portion is slidably received in the female key portion in a direction transverse to a length of the support member.

5. The support system of claim 1, wherein the deck includes a plurality of receptacles formed therein.

6. A support system, comprising;

a base having a plurality of legs depending from a support portion, the support portion having a slot disposed therein;

a support member disposed in the slot; and a deck configured to slidably engage the support member, wherein the deck comprises a plurality of panels wherein each of the panels includes a coupling feature formed along a perimeter thereof, the coupling feature of a first panel configured to cooperate with the coupling feature of a second panel to selectively couple the first panel to the second panel; and a coupling member, wherein a first portion of the coupling member is configured to be received in the coupling feature of the first panel and a second portion of the coupling member is configured to be received in the coupling feature of the second panel to selectively couple the first panel to the second panel.

7. The support system of claim 6, wherein the coupling feature is a T-shaped recess formed in a top surface of the panel, and the coupling member includes opposing T-shaped ends forming each of the first portion and the second portion, each of the T-shaped ends configured to be received in the T-shaped recess of the panel.

8. A support system, comprising;

a base having a plurality of legs depending from a support portion, the support portion having a slot disposed therein;

a support member disposed in the slot;

a deck configured to slidably engage a top portion of the support member; and a clamp configured to slidably engage the top portion of the support member, wherein the deck comprises a plurality of panels, a first one of the panels coupled to an adjacent second one of the panels with a coupling member, and wherein the base comprises a plurality of sawhorses, each one of the sawhorses including the support portion, wherein the support portion of a first one of the sawhorses is connected to the support portion of a second one of the sawhorses by the support member.

9. The support system of claim 8, comprising a first support member and a second support member, the second support member parallel to the first support member.

* * * * *